United States Patent
Geng et al.

(10) Patent No.: US 11,789,709 B2
(45) Date of Patent: Oct. 17, 2023

(54) INTERMEDIATE REPRESENTATION CONSTRUCTION METHOD, COMPILER, AND SERVER

(71) Applicant: Huawei Technologies Co., Ltd., Guangdong (CN)

(72) Inventors: Zhen Geng, Shenzhen (CN); Peng Di, Shenzhen (CN); Xiaoqiang Dan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/697,305

(22) Filed: Mar. 17, 2022

(65) Prior Publication Data

US 2022/0206765 A1 Jun. 30, 2022

Related U.S. Application Data

(63) Continuation of application No. PCT/CN2020/115759, filed on Sep. 17, 2020.

(30) Foreign Application Priority Data

Sep. 18, 2019 (CN) .......................... 201910896548.1
Dec. 11, 2019 (CN) .......................... 201911271859.5

(51) Int. Cl.
*G06F 8/41* (2018.01)

(52) U.S. Cl.
CPC ....................... *G06F 8/41* (2013.01)

(58) Field of Classification Search
CPC .......................................................... G06F 8/41

(Continued)

(56) References Cited

U.S. PATENT DOCUMENTS

| 9,715,502 B1 | 7/2017 | Manukonda |
| 2011/0004812 A1* | 1/2011 | Yang ................. H03M 13/2906 714/784 |

(Continued)

FOREIGN PATENT DOCUMENTS

| CN | 108292241 A | 7/2018 |
| CN | 108292374 A | 7/2018 |

(Continued)

OTHER PUBLICATIONS

Title: CloudNet: dynamic pooling of cloud resources by live WAN migration of virtual machines, author: T Wood, published on 2011.*

(Continued)

*Primary Examiner* — Chameli Das
(74) *Attorney, Agent, or Firm* — WOMBLE BOND DICKINSON (US) LLP

(57) ABSTRACT

An intermediate representation construction method is provided. The method includes: obtaining a first intermediate representation (IR), where the first IR includes a computing statement, the computing statement includes a tensor and an operator, an operation represented by the operator is performed by a computing unit, the computing unit is configured to perform an operation on data that is migrated through a first storage location and a second storage location sequentially, and the tensor is data that is used when the operation represented by the operator is performed; and generating a second IR based on the computing statement, where the second IR includes first data migration information and data segmentation information.

17 Claims, 8 Drawing Sheets

(58) Field of Classification Search
USPC .......................................................... 717/146
See application file for complete search history.

(56) References Cited

U.S. PATENT DOCUMENTS

| | | | | |
|---|---|---|---|---|
| 2017/0177312 | A1* | 6/2017 | Boehm | G06F 8/41 |
| 2018/0013579 | A1* | 1/2018 | Fairweather | G06F 8/41 |
| 2018/0107456 | A1 | 4/2018 | Bruestle et al. | |
| 2018/0136912 | A1* | 5/2018 | Venkataramani | G06N 3/048 |
| 2018/0157471 | A1 | 6/2018 | Venkataramani et al. | |
| 2019/0130270 | A1 | 5/2019 | Nicol et al. | |
| 2021/0026614 | A1* | 1/2021 | Manoharan | G06F 8/60 |
| 2021/0286520 | A1* | 9/2021 | Baptist | G06F 3/0659 |
| 2022/0278821 | A1* | 9/2022 | Resch | G06F 3/0683 |

FOREIGN PATENT DOCUMENTS

| | | | |
|---|---|---|---|
| CN | 108345937 | A | 7/2018 |
| CN | 109074334 | A | 12/2018 |
| CN | 109558348 | A | 4/2019 |
| CN | 109558565 | A | 4/2019 |
| CN | 110515872 | A | 11/2019 |
| WO | 2017015071 | A1 | 1/2017 |
| WO | 2018217222 | A1 | 11/2018 |

OTHER PUBLICATIONS

Title: Toward cloud-based vehicular networks with efficient resource management, author: R Yu, published on 2013.*

Lan Huiying et al: "DLIR: An Intermediate Representation for Deep Learning Processors", Dec. 30, 2018 (Dec. 30, 2018), Advances in Databases and Information Systems; [Lecture Notes in Computer Science; Lect.Notes Computer], Springer International Publishing, Cham, pp. 169-173, XP047498492.

Tim Zerrell et al: "Stripe: Tensor Compilation via the Nested Polyhedral Model", arxiv.org, Cornell University Library, 201 Olin Library Cornell University Ithaca, NY 14853, Mar. 14, 2019 (Mar. 14, 2019), 13 Pages, XP081160911.

Venkataramani Swagath et al: "DeepTools: Compiler and Execution Runtime Extensions for RaPiD AI Accelerator", IEEE Micro, IEEE Service Center, Los Alamitos, CA, US, vol. 39, No. 5, Sep. 1, 2019 (Sep. 1, 2019), pp. 102-111, XP011744980.

Riyadh Baghdadi et al, TIRAMISU: A Polyhedral Compiler for Expressing Fast and Portable Code, arXiv:1804.10694v5 [cs.PL] Dec. 20, 2018, total 13 pages.

Tianqi Chen et al, TVM: An Automated End-to-End Optimizing Compiler for Deep Learning, 13th USENIX Symposium on Operating Systems Design and Implementation, Oct. 8-10, 2018, Carlsbad, CA, USA, total 17 pages.

* cited by examiner

INTERMEDIATE REPRESENTATION CONSTRUCTION METHOD, COMPILER, AND SERVER

CROSS-REFERENCE TO RELATED APPLICATIONS

This application is a continuation of International Application No. PCT/CN2020/115759, filed on Sep. 17, 2020, which claims priority to Chinese Patent Application No. 201910896548.1, filed on Sep. 18, 2019 and Chinese Patent Application No. 201911271859.5, filed on Dec. 11, 2019. All of the aforementioned patent applications are hereby incorporated by reference in their entireties.

TECHNICAL FIELD

This application relates to the field of electronic technologies, and in particular, to an intermediate representation construction method, a compiler, and a server.

BACKGROUND

As artificial intelligence (AI) technologies develop, AI chips designed based on a domain specific architecture (DSA) constantly emerge. Different from modern microprocessors, the DSA-based AI chips use a plurality of storage locations to shorten a data movement distance, to reduce overheads caused by data movement. As the DSA evolves and computing units and operator complexity increase, a quantity of storage locations multiplies. In this case, a tensor needs to be moved to a corresponding computing unit through a plurality of storage locations, to implement execution of an operator.

However, in the conventional technology, there is no intermediate representation (IR) construction method for migration of data to a computing unit through a plurality of storage locations.

SUMMARY

An embodiment of this application provides an intermediate representation construction method, including:
obtaining a first intermediate representation IR, where the first IR includes a computing statement, the computing statement includes a tensor and an operator, an operation represented by the operator is performed by a computing unit, the computing unit is configured to perform an operation on data that is migrated through a first storage location and a second storage location sequentially, and the tensor is data that is used when the operation represented by the operator is performed; and
generating a second IR based on the computing statement, where the second IR includes first data migration information and data segmentation information, the first data migration information indicates that a first migration path of the tensor includes a section that is from the first storage location to the second storage location, there may be a plurality of data transmission paths between the first storage location and the second storage location, there may be no other storage location on a data transmission path, for example, a direct data transmission path between the first storage location and the second storage location described below, there may be another storage location on a data transmission path, for example, a third storage location mentioned below, and the data segmentation information indicates a tensor size in each tensor migration to the second storage location.

In an embodiment, the computing unit is further configured to perform an operation on data using a second migration path, the second migration path includes a section that starts from the first storage location, passes through at least one third storage location, and ends at the second storage location, and the first migration path and the second migration path are different data migration paths.

In an embodiment, the at least one third storage location indicates a storage location in an on-chip buffer.

In an embodiment, method further includes:
generating first data flow information corresponding to the computing statement based on the computing statement, where the first data flow information includes second data migration information of the tensor, and the second data migration information indicates that the tensor is migrated from the first storage location to the second storage location through at least one third storage location sequentially; and
generating second data flow information based on the fact that there is a direct data transmission path between the first storage location and the second storage location, where the second data flow information includes the first data migration information.

In this embodiment, that there is a direct data transmission path between the first storage location and the second storage location may be understood as that there is a data transmission path that does not pass through any other storage location between the first storage location and the second storage location.

For example, the tensor is migrated to the computing unit through the first storage location, the at least one third storage location, and the second storage location sequentially. For another example, the tensor is migrated to the computing unit through at least one fourth storage location, the first storage location, and the second storage location sequentially. For another example, the tensor is migrated to the computing unit through at least one fourth storage location, the first storage location, the at least one third storage location, and the second storage location sequentially. For another example, the tensor is migrated to the computing unit through at least one fourth storage location, the first storage location, the at least one third storage location, the second storage location, and at least one fifth storage location sequentially.

In an embodiment, the first storage location indicates a storage location in an on-chip buffer, and the second storage location indicates a storage location in an on-chip buffer.

In an embodiment, the first storage location indicates memory, and the second storage location indicates a storage location in an on-chip buffer.

In an embodiment, the tensor includes a plurality of dimensions, each dimension corresponds to one axis variable, the axis variable is used to indicate a tensor size in a corresponding dimension, the data segmentation information includes a plurality of axis variables and axis segment variables corresponding to the axis variables, and the axis segment variable is used to indicate a tensor size in a corresponding dimension in a case of tensor migration.

In an embodiment, the second IR further includes at least one target variable and a value range of each target variable, the axis variable is linearly related to the at least one target variable, and the axis variable indicates a tensor size in a corresponding dimension by using the at least one target variable and the value range of the at least one target variable.

In an embodiment, the second IR is an IR of a tree structure, the tree structure includes a root node and a subnode, the root node corresponds to the computing statement, the subnode corresponds to the second storage location, the second IR includes information about the subnode corresponding to the second storage location, and the information about the subnode corresponding to the second storage location includes the first data migration information and the data segmentation information.

In an embodiment, the second IR further includes data movement information, and the data movement information indicates that the tensor is moved from the first storage location to the second storage location.

In an embodiment, the method further includes:
  determining the first storage location and the second storage location based on a type of the computing unit.

According to a second aspect, this application provides a compiler, including:
  an obtaining unit, configured to obtain a first intermediate representation IR, where the first IR includes a computing statement, the computing statement includes a tensor and an operator, an operation represented by the operator is performed by a computing unit, the computing unit is configured to perform an operation on data that is migrated through a first storage location and a second storage location sequentially, and the tensor is data that is used when the operation represented by the operator is performed; and
  a processing unit, configured to generate a second IR based on the computing statement, where the second IR includes first data migration information and data segmentation information, the first data migration information indicates that a first migration path of the tensor includes a section that is from the first storage location to the second storage location, and the data segmentation information indicates a tensor size in each tensor migration to the second storage location.

In an embodiment, the computing unit is further configured to perform an operation on data using a second migration path, the second migration path includes a section that starts from the first storage location, passes through at least one third storage location, and ends at the second storage location, and the first migration path and the second migration path are different data migration paths.

In an embodiment, the at least one third storage location indicates a storage location in an on-chip buffer.

In an embodiment, in an optional design of the second aspect, the processing unit is further configured to: generate first data flow information corresponding to the computing statement based on the computing statement, where the first data flow information includes second data migration information of the tensor, and the second data migration information indicates that the tensor is migrated from the first storage location to the second storage location through at least one third storage location sequentially; and
  generate second data flow information based on the fact that there is a direct data transmission path between the first storage location and the second storage location, where the second data flow information includes the first data migration information.

In an embodiment, the first storage location indicates a storage location in an on-chip buffer, and the second storage location indicates a storage location in an on-chip buffer.

In an embodiment, the first storage location indicates memory, and the second storage location indicates a storage location in an on-chip buffer.

In an embodiment, the tensor includes a plurality of dimensions, each dimension corresponds to one axis variable, the axis variable is used to indicate a tensor size in a corresponding dimension, the data segmentation information includes a plurality of axis variables and axis segment variables corresponding to the axis variables, and the axis segment variable is used to indicate a tensor size in a corresponding dimension in a case of tensor migration.

In an embodiment, the second IR further includes at least one target variable and a value range of each target variable, the axis variable is linearly related to the at least one target variable, and the axis variable indicates a tensor size in a corresponding dimension by using the at least one target variable and the value range of the at least one target variable.

In an embodiment, the second IR is an IR of a tree structure, the tree structure includes a root node and a subnode, the root node corresponds to the computing statement, the subnode corresponds to the second storage location, the second IR includes information about the subnode corresponding to the second storage location, and the information about the subnode corresponding to the second storage location includes the first data migration information and the data segmentation information.

In an embodiment, the second IR further includes data movement information, and the data movement information indicates that the tensor is moved from the first storage location to the second storage location.

In an embodiment, the processing unit is further configured to:
  determine the first storage location and the second storage location based on a type of the computing unit.

According to a third aspect, this application provides a computer system, including a processor and a storage.

The processor is electrically connected to the storage.

The processor is configured to invoke code in the storage to perform the method according to any one of the optional designs of the first aspect.

According to a fourth aspect, this application provides a computer-readable storage medium. The computer-readable storage medium stores instructions. When the instructions are run on a computer, the computer is enabled to perform the method according to any one of the optional designs of the first aspect.

According to a fifth aspect, an embodiment of this application provides an intermediate representation construction method, including:
  obtaining a first intermediate representation IR, where the first IR includes a computing statement, the computing statement includes a tensor and an operator, an operation represented by the operator is performed by a computing unit, the tensor is migrated to the computing unit through a first storage location and a second storage location sequentially, and the tensor is data that is used when the operation represented by the operator is performed; and
  generating a second IR based on the computing statement, where the second IR includes first data migration information and data segmentation information, the first data migration information indicates that a migration path of the tensor includes a section that is from the first storage location to the second storage location, and the data segmentation information indicates a tensor size in each migration to the second storage location.

In an embodiment, the first storage location may be a starting storage location on the migration path of the tensor.

In an embodiment, the first storage location and the second storage location may be adjacent storage locations.

In an embodiment, there may alternatively be another storage location between the first storage location and the second storage location.

In an embodiment, there may alternatively be another storage location between the second storage location and the computing unit.

For example, the tensor is migrated to the computing unit through the first storage location, at least one third storage location, and the second storage location sequentially. For another example, the tensor is migrated to the computing unit through at least one fourth storage location, the first storage location, and the second storage location sequentially. For another example, the tensor is migrated to the computing unit through at least one fourth storage location, the first storage location, at least one third storage location, and the second storage location sequentially. For another example, the tensor is migrated to the computing unit through at least one fourth storage location, the first storage location, at least one third storage location, the second storage location, and at least one fifth storage location sequentially.

In an embodiment, in an optional design of the fifth aspect, the generating a second IR based on the computing statement includes: generating the second IR based on the computing statement, a storage size corresponding to the first storage location, and a storage size corresponding to the second storage location. The second IR includes the first data migration information and the data segmentation information. The first data migration information indicates that the migration path of the tensor includes the section that is from the first storage location to the second storage location. The data segmentation information indicates the tensor size in each migration to the second storage location.

In an embodiment, the first storage location indicates a storage location in an on-chip buffer, and the second storage location indicates a storage location in an on-chip buffer.

In an embodiment, the first storage location is memory, and the second storage location indicates a storage location in an on-chip buffer.

In an embodiment, the tensor corresponds to a target variable in the computing statement, and the second IR further includes a value range of the target variable and a mapping from the target variable to a tensor in the first storage location.

In an embodiment, the data segmentation information includes a corresponding value range of the target variable in each tensor migration to the second storage location.

In an embodiment, the tensor includes a target axis variable, a tensor segment includes an axis segment variable of the target axis variable, and the data segmentation information includes a size relationship between the axis segment variable and the target axis variable in each tensor migration to the second storage location.

In an embodiment, the second IR includes information about a node corresponding to the second storage location, and the information about the node includes the first data migration information and the data segmentation information.

In an embodiment, the second IR further includes read/write information. The read/write information indicates that the second storage location reads the tensor from the first storage location.

In an embodiment, the method further includes:
generating first data flow information corresponding to the computing statement, where the first data flow information includes the first data migration information associated with the tensor, and the first data migration information indicates that the tensor is migrated from the first storage location to the second storage location.

In an embodiment, the generating first data flow information corresponding to the computing statement includes:
generating the first data flow information corresponding to the computing statement, where the first data flow information includes second data migration information of the tensor, and the second data migration information indicates that the tensor is migrated from the first storage location to the second storage location through the at least one third storage location sequentially; and
generating the first data flow information based on the fact that there is a data transmission path between the first storage location and the second storage location, where the first data flow information includes the data migration information associated with the tensor.

In an embodiment, the third storage location is an on-chip buffer.

In an embodiment, the method further includes:
determining the first storage location and the second storage location based on a type of the computing unit.

According to a sixth aspect, this application provides a compiler, including:
an obtaining unit, configured to obtain a first intermediate representation IR, where the first IR includes a computing statement, the computing statement includes a tensor and an operator, an operation represented by the operator is performed by a computing unit, the tensor is migrated to the computing unit through a first storage location and a second storage location sequentially, and the tensor is data that is used when the operation represented by the operator is performed; and
a processing unit, configured to generate a second IR based on the computing statement, where the second IR includes first data migration information and data segmentation information, the first data migration information indicates that a migration path of the tensor includes a section that is from the first storage location to the second storage location, and the data segmentation information indicates a tensor size in each migration to the second storage location.

In an embodiment, the first storage location indicates a storage location in an on-chip buffer, and the second storage location indicates a storage location in an on-chip buffer.

In an embodiment, the first storage location is memory, and the second storage location indicates a storage location in an on-chip buffer.

In an embodiment, the tensor corresponds to a target variable in the computing statement, and the second IR further includes a value range of the target variable and a mapping from the target variable to a tensor in the first storage location.

In an embodiment, the data segmentation information includes a corresponding value range of the target variable in each tensor migration to the second storage location.

In an embodiment, the tensor includes a target axis variable, a tensor segment includes an axis segment variable of the target axis variable, and the data segmentation information includes a size relationship between the axis segment variable and the target axis variable in each tensor migration to the second storage location.

In an embodiment, the second IR includes information about a node corresponding to the second storage location, and the information about the node includes the first data migration information and the data segmentation information.

In an embodiment, the second IR further includes read/write information. The read/write information indicates that the second storage location reads the tensor from the first storage location.

In an embodiment, the processing unit is further configured to:
generate first data flow information corresponding to the computing statement, where the first data flow information includes the first data migration information associated with the tensor, and the first data migration information indicates that the tensor is migrated from the first storage location to the second storage location.

In an embodiment, the processing unit is specifically configured to:
generate the first data flow information corresponding to the computing statement, where the first data flow information includes second data migration information of the tensor, and the second data migration information indicates that the tensor is migrated from the first storage location to the second storage location through at least one third storage location sequentially; and
generate the first data flow information based on the fact that there is a data transmission path between the first storage location and the second storage location, where the first data flow information includes the data migration information associated with the tensor.

In an embodiment, the third storage location is an on-chip buffer.

In an embodiment, the processing unit is further configured to:
determine the first storage location and the second storage location based on a type of the computing unit.

According to a seventh aspect, a computer system is provided, including a processor and a storage.

The processor is electrically connected to the storage.

The processor is configured to invoke code in the storage to perform the method according to any one of the optional designs of the fifth aspect.

According to an eighth aspect, this application provides a computer-readable storage medium. The computer-readable storage medium stores instructions. When the instructions are run on a computer, the computer is enabled to perform the method according to any one of the optional designs of the fifth aspect.

The embodiments of this application provide the intermediate representation construction method, including: obtaining a first intermediate representation IR, where the first IR includes a computing statement, the computing statement includes a tensor and an operator, an operation represented by the operator is performed by a computing unit, the computing unit is configured to perform an operation on data that is migrated through a first storage location and a second storage location sequentially, and the tensor is data that is used when the operation represented by the operator is performed; and generating a second IR based on the computing statement, where the second IR includes first data migration information and data segmentation information, the first data migration information indicates that a first migration path of the tensor includes a section that is from the first storage location to the second storage location, and the data segmentation information indicates a tensor size in each tensor migration to the second storage location. In the foregoing manner, the compiler can construct an intermediate representation capable of expressing migration (including a migration direction and a tensor size in a migration) of a tensor between different storage locations (an on-chip buffer or memory). This can be applied to construction of an IR in an AI chip that is for a DSA.

DESCRIPTION OF EMBODIMENTS

The embodiments of this application provide an intermediate representation construction method, a compiler, and a server, to construct an intermediate representation capable of expressing migration (including a migration direction and a tensor size in a migration) of a tensor between different storage locations (an on-chip buffer or memory).

The following describes the embodiments of this application with reference to the accompanying drawings. A person of ordinary skill in the art may learn that, with technology development and emergence of a new scenario, the technical solutions provided in the embodiments of this application are also applicable to a similar technical problem.

In the specification, claims, and the accompanying drawings of this application, terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, terms "include", "have", and any other variations thereof are intended to cover the non-exclusive inclusion, so that a process, method, system, product, or device that includes a series of units is not limited to those units, but may include other units not expressly listed or inherent to such a process, method, product, or device.

Figure 1:
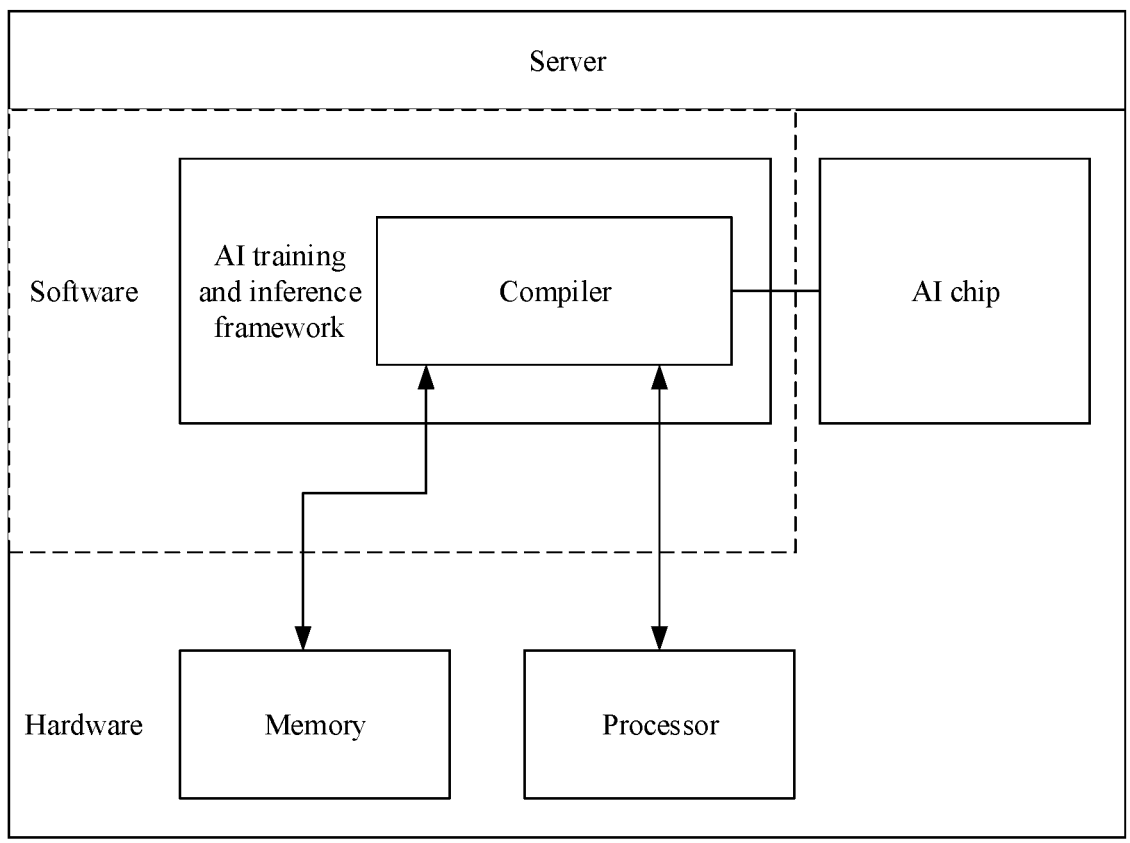
FIG. 1 is a schematic diagram of an application architecture according to an embodiment of this application.

FIG. 1 is a schematic diagram of an application architecture according to an embodiment of this application. As shown in FIG. 1, this application may be applied to a server.

The server may include an AI training and inference framework that belongs to software. The AI training and inference framework may include a compiler. In this embodiment of this application, the compiler may obtain source code from a storage, and compile the source code into an intermediate representation and a machine language that can be recognized and executed by an AI chip.

Figure 2:
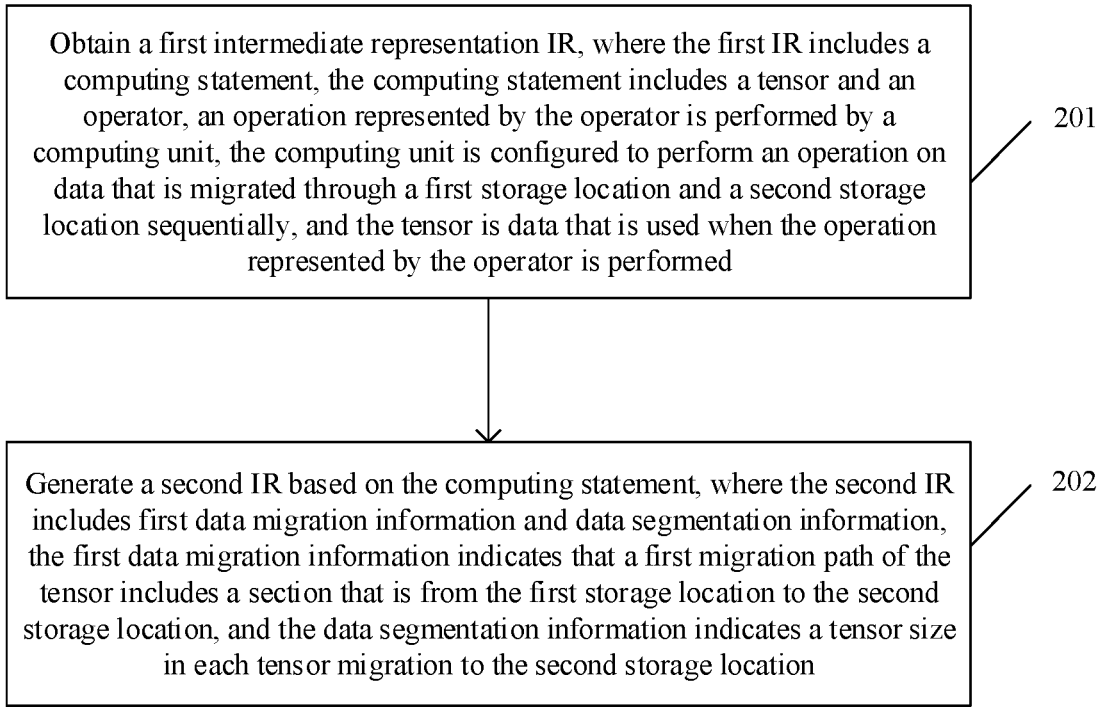
FIG. 2 is a schematic flowchart of an intermediate representation construction method according to an embodiment of this application.

FIG. 2 is a schematic flowchart of an intermediate representation construction method according to an embodiment of this application. As shown in FIG. 2, the intermediate representation construction method provided in this application includes the following operations.

201. A compiler obtains a first intermediate representation IR, where the first IR includes a computing statement, the computing statement includes a tensor and an operator, an operation represented by the operator is performed by a computing unit, the computing unit is configured to perform an operation on data that is migrated through a first storage location and a second storage location sequentially, and the tensor is data that is used when the operation represented by the operator is performed.

In an embodiment, the compiler may obtain the first intermediate representation (IR).

It should be understood that the first IR may be generated in a manner such as parsing and compiling computer source code or decompiling an existing computer program, or the first IR is obtained from the outside. The source code used for generating the first IR may be written by using an application programming interface of a high-level programming language. The high-level programming language may be a domain specific language (DSL).

The first IR may be stored in a storage (an external or internal storage of a server). In this embodiment of this application, the compiler may read the first IR from the storage (the external or internal storage of the server). Specifically, the first IR may be described by the DSL. In this embodiment of this application, the DSL may be Halide, Graphlt, Spatial, or another customized domain specific language. Halide is applicable to vector and tensor operations. Graphlt is applicable to the field of graph computing. Spatial is applicable to the field of programmable hardware. The customized domain specific language is applicable to a corresponding customized field.

In this embodiment of this application, the compiler may sequentially traverse the computing statements in the obtained first IR, and analyze a computing unit to be used by each computing statement.

In an embodiment, the computing unit may include at least a scalar computing unit, a vector computing unit, and a cube computing unit.

In this embodiment of this application, for different operator types, computing units to be used are different. For example, the vector computing unit may support addition (add) operations, subtraction (sub) operations, multiplication (mul) operations, reciprocal (rec) operations, exponential (exp) operations, logarithmic (log) operations, quantization operations, and the like, and the cube computing unit may support convolution operations.

In architectures of some AI chips (for example, AI chips that are based on a domain specific architecture (DSA)), many dedicated on-chip buffers are used to shorten a data movement distance, to reduce overheads caused by data movement. As the DSA evolves and computing units and operator complexity increase, types of the on-chip buffers multiply. For example, a versatile tensor accelerator (VTA) has three types of on-chip buffers, and there may be five or more types of on-chip buffers in another processor. This is not limited in this application.

Figure 3:
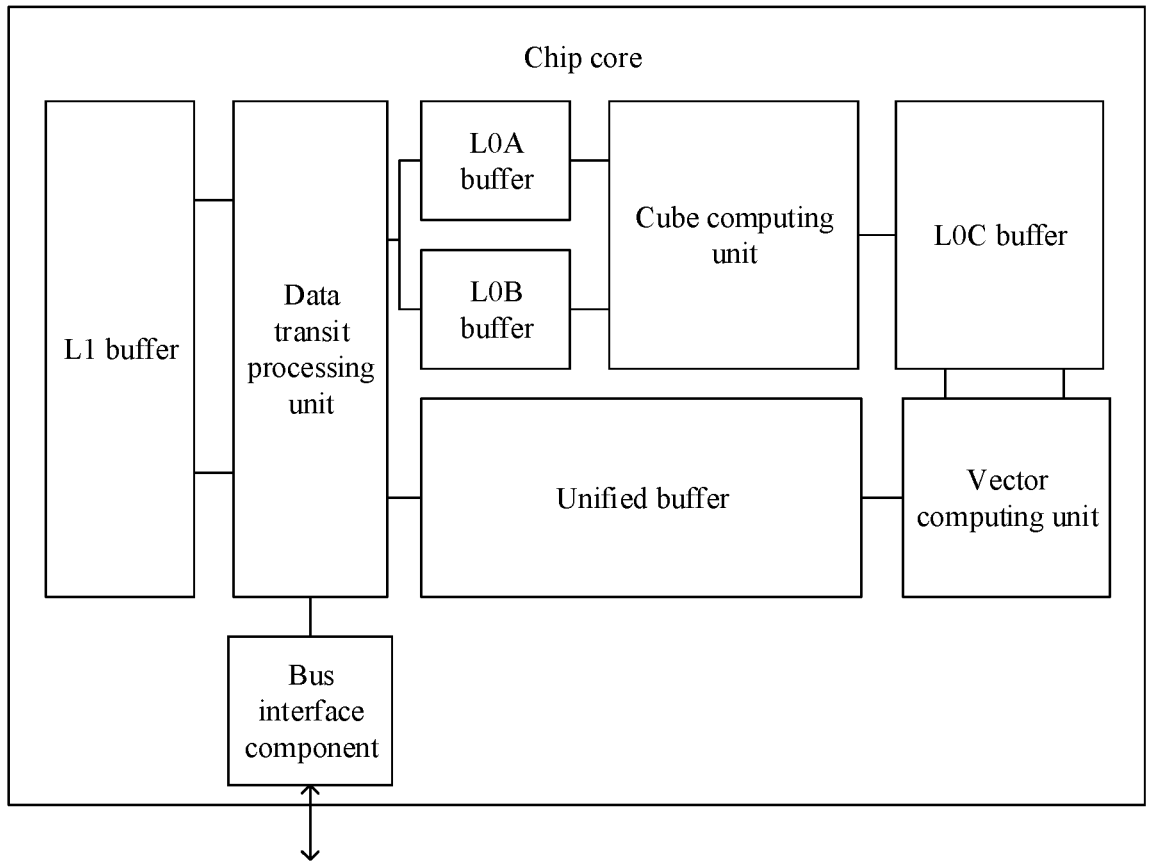
FIG. 3 is a schematic diagram of a structure of an AI core in an AI chip according to an embodiment of this application.

FIG. 3 is a schematic diagram of a structure of an AI core in an AI chip according to an embodiment of this application. As shown in FIG. 3, the AI core includes a plurality of on-chip buffers (an L1 buffer, an L0A buffer, an L0B buffer, an L0C buffer, and a unified buffer), a plurality of computing units (a cube computing unit and a vector computing unit), a data transit processing unit, and a bus interface component. The bus interface component can obtain a tensor in memory in the AI chip and migrate the tensor to a corresponding computing unit through the on-chip buffers, to implement a corresponding operation.

It should be noted that after a computing unit is determined, a migration route of data (a tensor) may be determined based on a specific architecture of the AI core. The migration route may not be unique. That is, the data may be migrated to the computing unit through a plurality of migration routes and different on-chip buffers.

It should be noted that "migrate" in this application may indicate reading of data. For example, that a tensor is migrated from a buffer 1 to a buffer 2 may indicate that the buffer 2 reads the tensor in the buffer 1.

It should be noted that the AI core may further include a data control unit, although it is not shown in FIG. 3. The data control unit may control a migration direction of a tensor in an on-chip buffer.

It should be noted that the on-chip buffer in FIG. 3 and the storage in the server in FIG. 1 may be understood as different storage media (the on-chip buffer is a storage medium in the AI chip).

In this embodiment of this application, the computing statement in the first IR may include at least one tensor and an operator related to the at least one tensor. The tensor is data and may be understood as, for example, a multidimensional vector.

In this embodiment of this application, the operator may represent an operation rule. For example, an operator represents the multiplication operation, and correspondingly, the operator needs to be performed by the vector computing unit. A tensor needs to sequentially go through the memory, the bus interface component, and the unified buffer before the tensor can be migrated from the memory to the vector computing unit. In other words, the vector computing unit is configured to obtain the tensor through the memory and the unified buffer sequentially, to implement an operation of the operator.

An example is used in which the first IR is a Halide IR. For example, for the first IR, refer to the following IR example.

```
#Example of the first IR
for(i1,0,64){
    for(i2,0,64){
        result(i1,i2)=input_1(i1,i2)*input_2(i1,i2)}}
```

In the example, input_1(i1,i2) represents a tensor A, input_2(i1,i2) represents a tensor B, and result(i1,i2) is a result. for(i1,0,64) represents one layer of for loop, and a traversal rule is that a target variable i1 starts from 0, accumulates by 1 each time, and accumulates 64 times. result(i1,i2) is a two-dimensional tensor, which is a product of the tensor A and the tensor B, and a maximum value of result(i1,i2) in each dimension is 64.

It should be noted that the target variable may be a loop variable in a computing statement, and a part of the loop variable may be a target variable of a tensor included in the loop variable.

In this embodiment of this application, the compiler can obtain the computing statement in the first IR. The computing statement includes the tensor A, the tensor B, a tensor (result), and the operator (the multiplication operation). Further, the compiler can determine that a computing unit corresponding to the operator (the multiplication operation) is the vector computing unit. The vector computing unit is configured to obtain the tensor through the memory and the unified buffer sequentially, to implement an operation of the operator (the multiplication operation).

In an embodiment, the compiler may generate first data flow information corresponding to the computing statement. The first data flow information includes first data migration information associated with the tensor. The first data migration information indicates that the tensor is migrated from the first storage location to the second storage location.

In an embodiment, the first storage location indicates a storage location in an on-chip buffer, and the second storage location indicates a storage location in an on-chip buffer.

In an embodiment, the first storage location indicates a storage location in memory, and the second storage location indicates a storage location in an on-chip buffer.

It should be noted that data flow information in this embodiment of this application may indicate migration of a tensor in the AI core, and may be, for example, a data stack structure. The structure may indicate a migration path of the tensor in the AI core. A specific implementation of the data flow information is not limited in this application.

Figure 4:
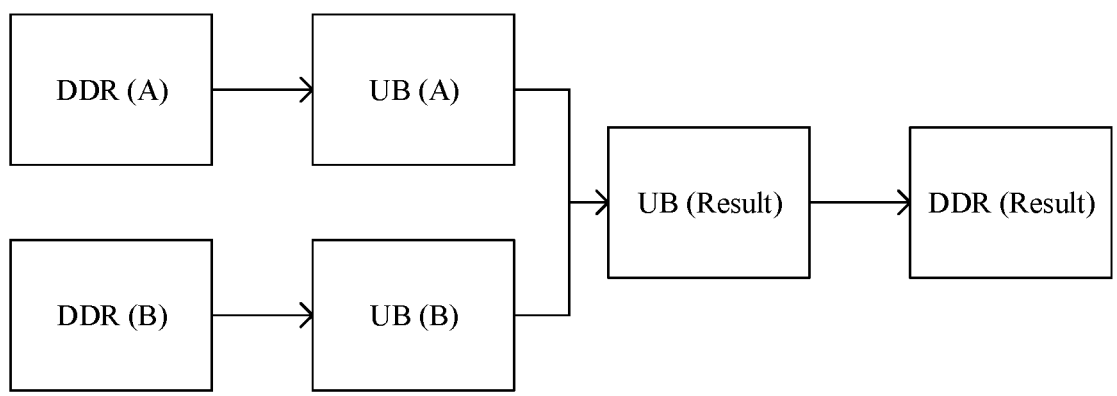
FIG. 4 is an abstract schematic diagram of data flow information according to an embodiment of this application.

The foregoing description is used as an example. FIG. 4 is an abstract schematic diagram of data flow information according to an embodiment of this application. As shown in FIG. 4, the compiler may generate the first data flow information corresponding to the computing statement. The first data flow information may indicate that the tensor A is migrated from the memory to the unified buffer, the tensor B is migrated from the memory to the unified buffer, and the tensor A and the tensor B are migrated to the vector computing unit. The vector computing unit may perform a multiplication operation on the tensor A and the tensor B to obtain an operation result. Then, the operation result is migrated to the memory.

Data migration information associated with the tensor A in the first data flow information is "memory (A)-UB (A)". It should be noted that UB in FIG. 4 is the unified buffer. Data migration information associated with the tensor B is "memory (B)-UB (B)". Data migration information associated with the tensor result is "UB (result)-memory (result)".

202. The compiler generates a second IR based on the computing statement, where the second IR includes the first data migration information and data segmentation information, the first data migration information indicates that a first migration path of the tensor includes a section that is from the first storage location to the second storage location, and the data segmentation information indicates a tensor size in each tensor migration to the second storage location.

In this embodiment of this application, the compiler may generate the second IR. The second IR and the first IR may be intermediate representations described based on different languages. In an embodiment, the second IR may be implemented based on a polyhedral compilation technology.

In this embodiment of this application, the second IR may be implemented based on a schedule tree of a polyhedron technology. The schedule tree may include a root node and a subnode. The root node is a domain node, and includes the computing statement of the operator and a value range of a variable in the computing statement. A mark of a specific range node (band node) in the second IR is "child" or "schedule".

In this embodiment of this application, the second IR may include data migration information. The data migration information indicates that the tensor is migrated from the first storage location to the second storage location.

Refer to the following example of the second IR.

```
#Example of the second IR
Domain :{S_0[i1,i2]: 0<=i1<=63 and 0<=i2<=63} //first part
Child:
    Mark: "realize_UB"
    Child:
        Extension:"{[i1,i2]->L1read[[[i1,i2]->A[arg0,arg1]]->A_
        local_L1[arg0',arg1'
]]}"//second part
```

The first part indicates a statement in the first IR and value ranges of target variables (i1 and i2) related to the statement. "Mark" is a mark node, where "realize_UB" indicates that a type of an on-chip buffer is "Unified buffer". That is, "Mark: "realize_UB"" indicates information about a node corresponding to the second storage location (UB). Correspondingly, the information about the node corresponding to the second storage location (UB) includes data migration information and data segmentation information that correspond to the second storage location (UB).

The second part indicates the data migration information and the data segmentation information of the tensor, that is, a movement mapping relationship from the memory to the on-chip buffer UB. i1 and i2 represent the target variables related to the statement, arg0 and arg1 represent axis variables of the tensor, and arg0' and arg1' represent axis segment variables of a first tensor.

It should be noted that because the on-chip buffers may have different storage capacities, the tensor needs to be segmented, and therefore, each subsequent tensor migration process is performed based on the segmented tensor.

Specifically, [i1,i2]->L1read[[[i1,i2]->A[arg0,arg1]]-> A_local_L1[arg0',arg1']] indicates a mapping relationship for migrating the first tensor from the memory to the on-chip buffer UB, and "->" indicates one layer of mapping relationship. [[i1,i2]->A[arg0,arg1]] indicates mapping from the target variables i1 and i2 to a tensor in the first storage location (the memory). [[i1,i2]->A[arg0,arg1]]->A_local_L1[arg0',arg1'] indicates mapping from the tensor in the first storage location (the memory) to a tensor in the second storage location (the UB). A_local_L1[arg0',arg1'] indicates that data segmentation needs to be performed each time the tensor is migrated to the second storage location.

In an embodiment, the tensor includes a plurality of dimensions, each dimension corresponds to one axis variable (for example, the foregoing arg0 and arg1), the axis variable is used to indicate a tensor size in a corresponding dimension, the data segmentation information includes a plurality of axis variables and axis segment variables corresponding to the axis variables, and the axis segment variable is used to indicate a tensor size in a corresponding dimension in a case of tensor migration.

In an embodiment, the second IR further includes at least one target variable and a value range of each target variable, the axis variable is linearly related to the at least one target variable, and the axis variable indicates a tensor size in a corresponding dimension by using the at least one target variable and the value range of the at least one target variable.

In this embodiment of this application, a tensor size in a dimension corresponding to an axis variable may be represented by a linear combination of the target variables and the value ranges of the target variables. For example, ---
For(i0,0,265) {
   For(i1,0,512)
}
--- arg0>=64i0 and 0<=arg0<=255 and arg0<=63+64i0 and arg1>=512i1 and 0<=arg1<=511 and arg1<=511+512i1. The foregoing is an example of representations of tensor sizes in dimensions corresponding to the axis variable arg0 and the axis variable arg1. The tensor size in the dimension corresponding to arg0 is represented by i0, and the tensor size in the dimension corresponding to arg1 is represented by i1.

It should be noted that the representations of the axis variables are merely an example, and this is not limited herein.

In an embodiment, the second IR may further include a size relationship between the axis segment variable and the axis variable. For example, the second IR may include a size relationship between the axis segment variable arg0' and the axis variable arg0 and a size relationship between the axis segment variable arg1' and the axis variable arg1 in each migration process.

It should be noted that in this embodiment of this application, one axis variable corresponds to one dimension of a tensor, and a plurality of axis variables may represent a size of the tensor. An axis segment variable is a part of an axis variable obtained after the axis variable is segmented (or divided). Segmentation may be dividing an axis variable into a plurality of sub-axis variables, for example, dividing a 64×64 axis variable into two 32×64 axis segment variables.

For example, if 2arg1'=arg1 is specified, it is equivalent to that the axis variable arg1 is migrated by half a size of the axis variable arg1 each time in a migration process of the tensor (a size of an axis variable depends on a value range of a corresponding target variable). In this case, two migrations need to be performed to complete migration of the axis variable arg1.

In the foregoing manner, the compiler can construct an intermediate representation capable of expressing migration (including a migration direction and a tensor size in a migration) of a tensor between different storage locations.

It should be noted that although not shown, the second IR may further include an operation statement related to the operator in the computing statement. Because this application focuses only on a migration process of a tensor between on-chip buffers, compilation of the operator is not described in detail in this application.

In an embodiment, the compiler may obtain top data flow information (for example, memory (A) to UB(A) in FIG. 4) in the first data flow information, and determine an insertion location of the data flow information in the second IR based on the currently obtained data flow information. As described in the foregoing embodiment, in this case, the insertion location corresponding to the data flow information is "realize UB", and a segmentation size of the tensor is determined based on the size of the tensor. Segmentation may be segmentation of the axis variable corresponding to the tensor.

In current segmentation space, the compiler obtains information about direct movement of the tensor between different on-chip buffers under current segmentation.

For example, the movement information may be as follows:

$[[[i0,i1] \to A[arg0,arg1]] \to A\_local\_L1[arg0',arg1'];$ $2arg0'=arg0, 2arg1'=arg1$ In the example, i0 and i1 represent target variables related to the statement, A[arg0,arg1'] represents the tensor A and the axis variables of the tensor A, A_local_L1[arg0',arg1'] represents the tensor A_local_L1 in the on-chip buffer L1 and axis variables of the tensor A_local_L1, and 2arg0'=arg0,2arg1'=arg1 represents relationships between the axis variables of the tensor A_local_L1 and the axis variables of the tensor A.

The compiler may perform a Presburger operation identity based on the obtained information about movement between the on-chip buffers. The Presburger self-mapping operation mainly implements a self-to-self mapping relationship: $I=\{i \to i, i \in S\}$.

For example, the following mapping that maps to itself can be obtained:

$[[[i0,i1] \to A[arg0,arg1]] \to A\_local\_L1[arg0',arg1']] \to$ $[[[i0,i1] \to A[arg0,arg1]] \to A\_local\_L1[arg0',arg1']];$ The compiler may perform a Presburger operation DFDP based on the obtained self-mapping information. The DFDP is a multiplicative mapping relationship transformation of a domain domain: $DFDP=\{i \to k: j:[i \to j] \to k \in S\}$.

For example, the following multiplicative mapping result can be obtained:

$[i0,i1] \to [[[i0,i1] \to A[arg0,arg1]] \to A\_local\_L1[arg0',arg1']].$

After the multiplicative mapping result is obtained, read/write information of a range domain may be set.

For example, the following data migration information and data segmentation information can be obtained:

$[i0,i1] \to L1read[[[i0,i1] \to A[arg0,arg1]] \to A\_local\_L1[arg0',arg1']].$

L1read indicates reading of data.

The compiler may insert the data migration information and the data segmentation information under a subnode of "realize UB", to obtain the second IR.

This embodiment of this application provides the intermediate representation construction method, including: obtaining a first intermediate representation IR, where the first IR includes a computing statement, the computing statement includes a tensor and an operator, an operation represented by the operator is performed by a computing unit, the computing unit is configured to perform an operation on data that is migrated through a first storage location and a second storage location sequentially, and the tensor is data that is used when the operation represented by the operator is performed; and generating a second IR based on the computing statement, where the second IR includes first data migration information and data segmentation information, the first data migration information indicates that a first migration path of the tensor includes a section that is from the first storage location to the second storage location, and the data segmentation information indicates a tensor size in each tensor migration to the second storage location. In the foregoing manner, the compiler can construct an intermediate representation capable of expressing migration (including a migration direction and a tensor size in a migration) of a tensor between different storage locations (an on-chip buffer or memory). This can be applied to construction of an IR in an AI chip that is for a DSA.

Figure 5:
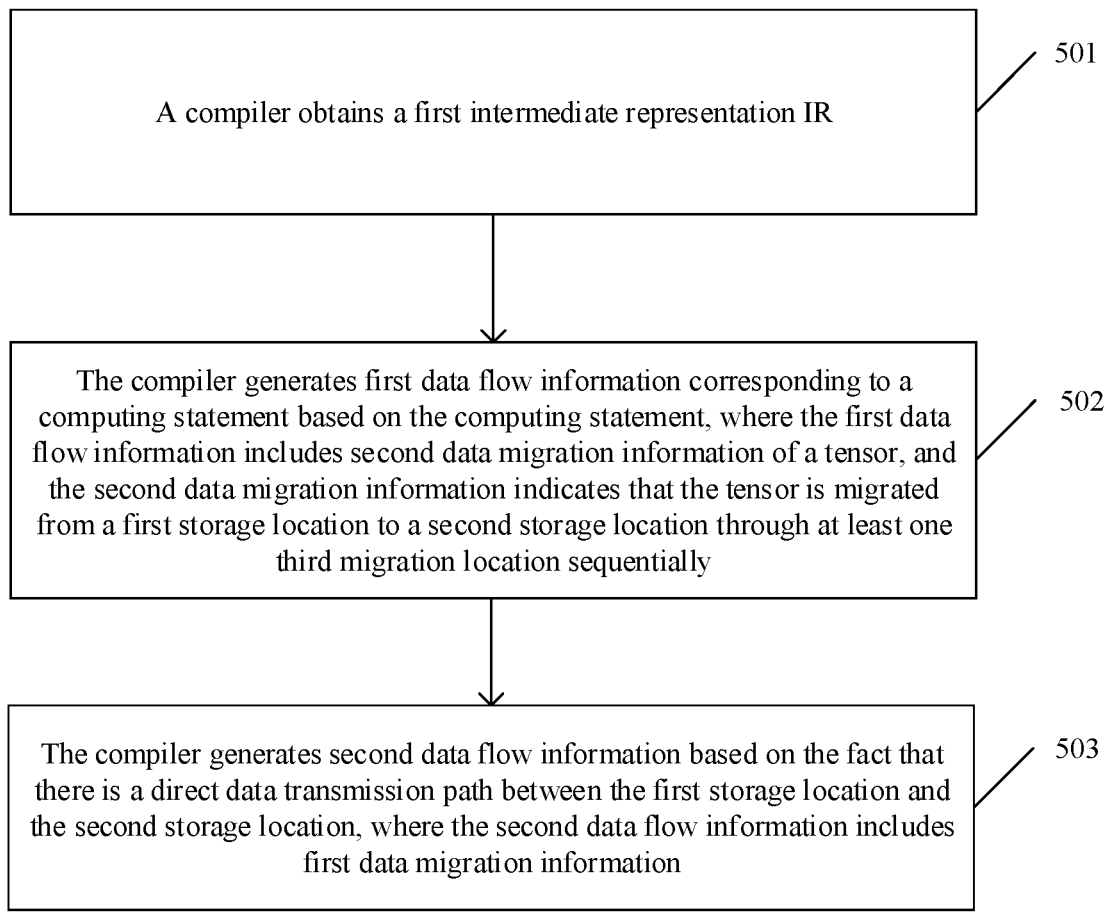
FIG. 5 is a schematic diagram of an embodiment of an intermediate representation construction method according to an embodiment of this application.

FIG. 5 is a schematic diagram of an embodiment of an intermediate representation construction method according to an embodiment of this application. As shown in FIG. 5, the intermediate representation construction method includes the following operations.

501. A compiler obtains a first intermediate representation IR.

For a specific description of operation 501, refer to operation 401. Details are not described herein again.

502. The compiler generates first data flow information corresponding to a computing statement based on the computing statement, where the first data flow information includes second data migration information of a tensor, and the second data migration information indicates that the tensor is migrated from a first storage location to a second storage location through at least one third storage location sequentially.

503. The compiler generates second data flow information based on the fact that there is a direct data transmission path between the first storage location and the second storage location, where the second data flow information includes first data migration information.

In an embodiment, the compiler may generate the first data flow information corresponding to the computing statement, where the first data flow information includes the second data migration information of the tensor, and the second data migration information indicates that the tensor is migrated from the first storage location to the second storage location through the at least one third storage location sequentially; and the compiler may generate the second data flow information based on the fact that there is a direct data transmission path between the first storage location and the second storage location (the direct data transmission path may be understood as that there is no other storage location between the first storage location and the second storage location, and the tensor may be transmitted from the first storage location directly to the second storage location without passing through another storage location), where the first data flow information includes the first data migration information. In an embodiment, the third storage location indicates a storage location in an on-chip buffer.

Figure 6:
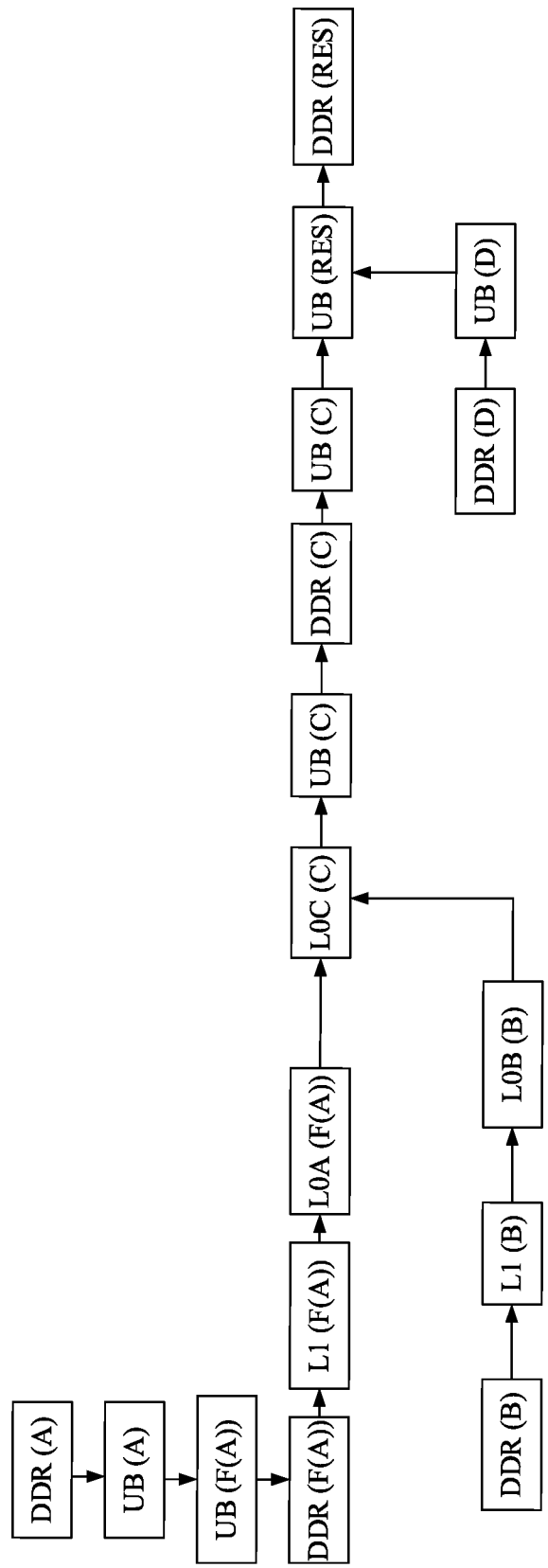
FIG. 6 is an abstract schematic diagram of data flow information according to an embodiment of this application.
Figure 7:
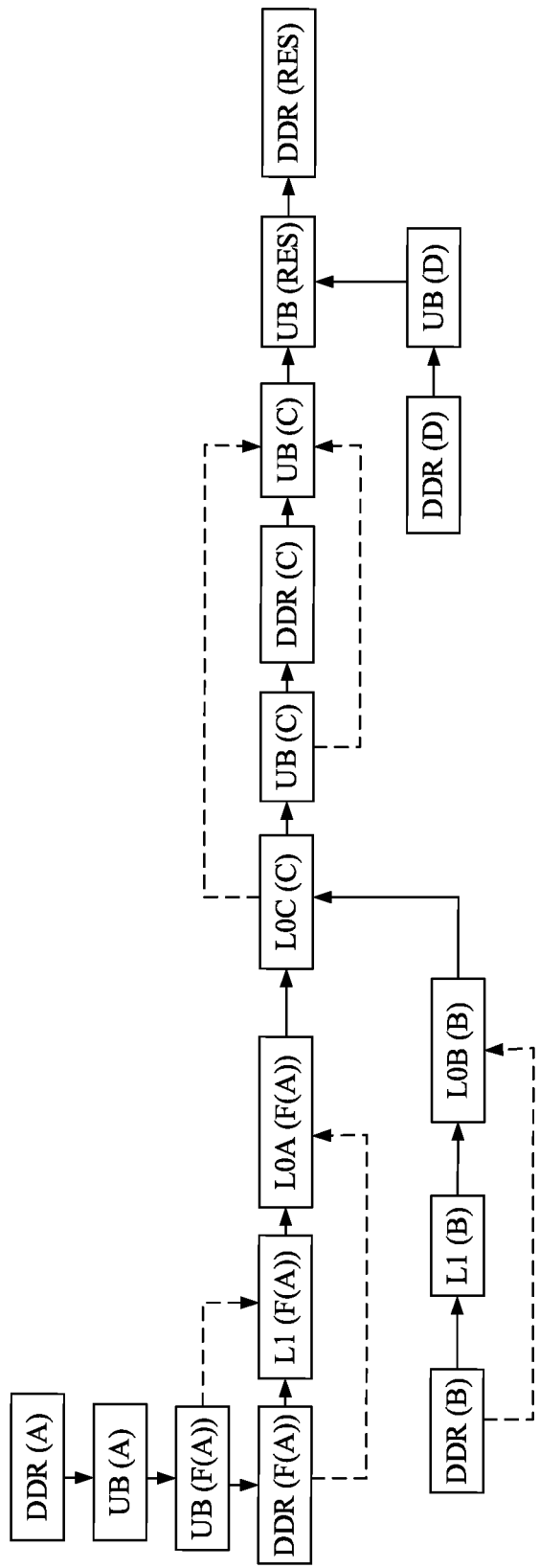
FIG. 7 is an abstract schematic diagram of data flow information according to an embodiment of this application.
Figure 8:
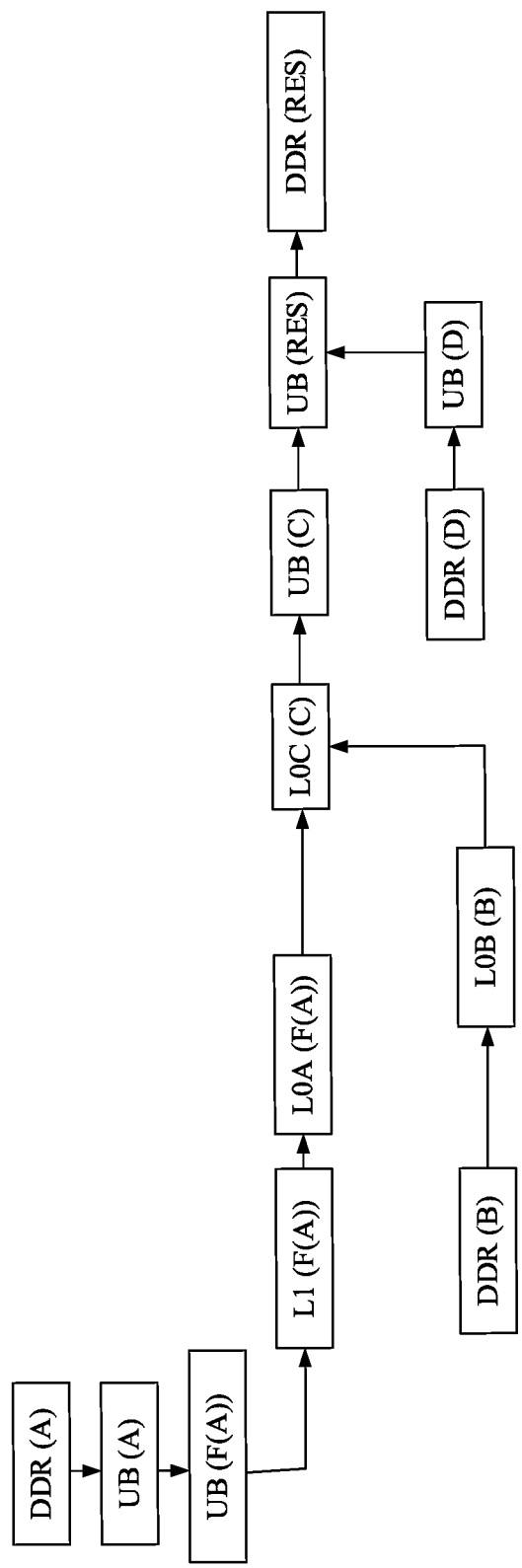
FIG. 8 is an abstract schematic diagram of data flow information according to an embodiment of this application.

In this embodiment of this application, in a scenario in which the computing statement includes a plurality of operators, the compiler may generate the second data flow information corresponding to the computing statement. As shown in FIG. 6, the initialized second data flow information includes many redundant migration processes. As shown in FIG. 7, a dashed line indicates an optional migration path. For example, on a migration route from a UB (F(A)), to a DDR (F(A)), and to an L1 (F(A)) (the UB corresponds to the first storage location, the DDR corresponds to the at least one third storage location, and the L1 corresponds to the second storage location), the UB buffer can transfer the tensor F(A) directly to the L1 buffer in this case, because it is learned from FIG. 3 that there is a data transmission path between the UB buffer and the L1 buffer. Correspondingly, as shown in FIG. 8, the second data flow information includes first data migration information associated with the tensor F(A) in this case. The first data migration information indicates that the tensor is migrated from the first storage location (UB buffer) to the second storage location (L1 buffer).

In an embodiment, a weight may be assigned to each migration. A larger weight indicates a higher cost of performance caused by migration. For a data flow weight table, refer to the following example of Table 1.

TABLE 1

| Buffer type | Weight |
| --- | --- |
| DDR | 3 |
| L1/UB | 2 |
| L0A/L0B/L0C | 1 |

The weight of the DDR quantizes a cost of performance caused by obtaining a tensor from memory. The weight of the L1/UB quantizes a cost of performance caused by obtaining a tensor from the L1 buffer or the UB buffer. The weight of the L0A/L0B/L0C quantizes a cost of performance caused by obtaining a tensor from an L01 buffer, an L0B buffer, or an L0C buffer.

It should be noted that the compiler further needs to mark whether an attribute of each edge in the data flow information is data movement or data computing. Only a data movement edge is allowed to be deleted in the processing procedure, and a data computing edge is not allowed to be deleted during optimization.

For example, because a route from a DDR (A) to the UB (F(A)) shown in FIG. 6 actually involves data computing on a tensor A (to obtain F(A)), the migration route from the DDR (A) to the UB (F(A)) is not allowed to be deleted.

The compiler may traverse all nodes in a data flow graph, and compute all starting nodesets with an indegree of 0 (for example, a DDR (A), a DDR (B), and a DDR (D) in FIG. 7) and all ending nodesets with an outdegree of 0 (for example, a DDR (RES) in FIG. 7), to obtain a table of all possible paths in the data flow graph. The path table may indicate possible paths from the starting nodesets to the ending nodesets.

A weight corresponding to each path is calculated, where the weight is a sum of weights of all migration processes on the path. Data flow information corresponding to a path with a smallest weight sum is determined as the first data flow information. For example, FIG. 8 shows an optimized first data flow graph.

An embodiment of this application provides the intermediate representation construction method, including: obtaining a first intermediate representation IR, where the first IR includes a computing statement, and the computing statement includes a tensor; generating first data flow information corresponding to the computing statement based on the computing statement, where the first data flow information includes second data migration information of the tensor, and the second data migration information indicates that the tensor is migrated from a first storage location to a second storage location through at least one third storage location sequentially; and generating second data flow information based on the fact that there is a direct data transmission path between the first storage location and the second storage location, where the second data flow information includes first data migration information. In the foregoing manner, redundant migration paths in the second data migration information are deleted, thereby reducing a tensor movement cost and system overheads on a basis of ensuring migration to the second storage location.

Figure 9:
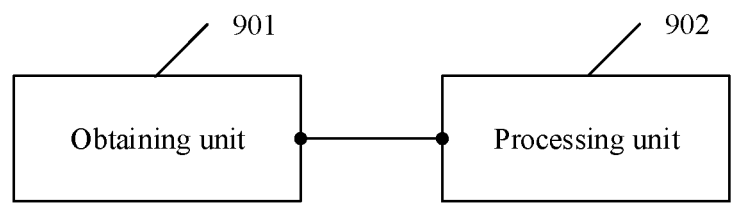
FIG. 9 is a schematic diagram of a structure of a compiler according to an embodiment of this application.

FIG. 9 is a schematic diagram of a structure of a compiler according to an embodiment of this application. As shown in FIG. 9, the compiler includes:

an obtaining unit 901, configured to obtain a first intermediate representation IR, where the first IR includes a computing statement, the computing statement includes a tensor and an operator, an operation represented by the operator is performed by a computing unit, the computing unit is configured to perform an operation on data that is migrated through a first storage location and a second storage location sequentially, and the tensor is data that is used when the operation represented by the operator is performed; and a processing unit 902, configured to generate a second IR based on the computing statement, where the second IR includes first data migration information and data segmentation information, the first data migration information indicates that a first migration path of the tensor includes a section that is from the first storage location to the second storage location, and the data segmentation information indicates a tensor size in each tensor migration to the second storage location.

In an embodiment, the computing unit is further configured to perform an operation on data using a second migration path, the second migration path includes a section that starts from the first storage location, passes through at least one third storage location, and ends at the second storage location, and the first migration path and the second migration path are different data migration paths.

In an embodiment, the at least one third storage location indicates a storage location in an on-chip buffer.

In an embodiment, the processing unit 902 is further configured to: generate first data flow information corresponding to the computing statement based on the computing statement, where the first data flow information includes second data migration information of the tensor, and the second data migration information indicates that the tensor is migrated from the first storage location to the second storage location through at least one third storage location sequentially; and generate second data flow information based on the fact that there is a direct data transmission path between the first storage location and the second storage location, where the second data flow information includes the first data migration information.

In an embodiment, the first storage location indicates a storage location in an on-chip buffer, and the second storage location indicates a storage location in an on-chip buffer.

In an embodiment, the first storage location indicates memory, and the second storage location indicates a storage location in an on-chip buffer.

In an embodiment, the tensor includes a plurality of dimensions, each dimension corresponds to one axis variable, the axis variable is used to indicate a tensor size in a corresponding dimension, the data segmentation information includes a plurality of axis variables and axis segment variables corresponding to the axis variables, and the axis segment variable is used to indicate a tensor size in a corresponding dimension in a case of tensor migration.

In an embodiment, the second IR further includes at least one target variable and a value range of each target variable, the axis variable is linearly related to the at least one target variable, and the axis variable indicates a tensor size in a corresponding dimension by using the at least one target variable and the value range of the at least one target variable.

In an embodiment, the second IR is an IR of a tree structure, the tree structure includes a root node and a subnode, the root node corresponds to the computing statement, the subnode corresponds to the second storage location, the second IR includes information about the subnode corresponding to the second storage location, and the information about the subnode corresponding to the second storage location includes the first data migration information and the data segmentation information.

In an embodiment, the second IR further includes data movement information, and the data movement information indicates that the tensor is moved from the first storage location to the second storage location.

In an embodiment, the processing module 902 is further configured to:

determine the first storage location and the second storage location based on a type of the computing unit.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all of the modules may be selected based on an actual requirement to achieve the objectives of the solutions of the embodiments. In addition, in the accompanying drawings of the apparatus embodiments provided in this application, connection relationships between modules indicate that the modules have communication connections to each other, which may be specifically implemented as one or more communications buses or signal cables.

Based on the descriptions of the foregoing implementations, a person skilled in the art may clearly understand that this application may be implemented by software in addition to necessary universal hardware, or certainly may be implemented by dedicated hardware, including a dedicated integrated circuit, a dedicated CPU, a dedicated storage, a dedicated component, and the like. Usually, all functions completed by a computer program may be easily implemented by using corresponding hardware, and a specific hardware structure used to implement a same function may also be of various forms, for example, a form of an analog circuit, a digital circuit, or a dedicated circuit. However, in this application, a software program implementation is a better implementation in most cases. Based on such an understanding, the technical solutions of this application essentially or the part contributing to a conventional technology may be implemented in a form of a software product. The computer software product is stored in a readable storage medium, such as a floppy disk, a USB flash drive, a removable hard disk, a ROM, a RAM, a magnetic disk, or a compact disc of a computer, and includes several instructions for instructing a computer device (which may be a personal computer, a training device, or a network device) to perform the methods described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. An intermediate representation construction method, comprising:

obtaining a first intermediate representation (IR), wherein the first IR comprises a computing statement, wherein the computing statement comprises a tensor and an operator, wherein the operator represents an operation that is performed by a processor configured to perform an operation on data that is migrated through a first storage location and a second storage location sequentially, and wherein the tensor is data that is used when the operation represented by the operator is performed; and generating a second IR based on the computing statement, wherein the second IR comprises first data migration information and data segmentation information, wherein the first data migration information indicates that a first migration path of the tensor comprises a section that is from the first storage location to the second storage location, and wherein the data segmentation information indicates a tensor size in each tensor migration to the second storage location, wherein the processor is further configured to perform an operation on data using a second migration path, wherein the second migration path comprises a section that starts from the first storage location, passes through at least one third storage location, and ends at the second storage location, and wherein the first migration path and the second migration path are different data migration paths.

2. The method according to claim 1, wherein the at least one third storage location indicates a storage location in an on-chip buffer.

3. The method according to claim 1, wherein the method further comprises:

generating first data flow information corresponding to the computing statement based on the computing statement, wherein the first data flow information comprises second data migration information of the tensor, and the second data migration information indicates that the tensor is migrated from the first storage location to the second storage location through at least one third storage location sequentially; and generating second data flow information based on a direct data transmission path between the first storage location and the second storage location, wherein the second data flow information comprises the first data migration information.

4. The method according to claim 1, wherein each of the first storage location and the second storage location indicates a storage location in an on-chip buffer.

5. The method according to claim 1, wherein the first storage location indicates memory, and the second storage location indicates a storage location in an on-chip buffer.

6. The method according to claim 1, wherein the tensor comprises a plurality of dimensions, wherein each dimension corresponds to one axis variable that indicates a tensor size of the dimension, wherein the data segmentation information comprises a plurality of axis variables and axis segment variables corresponding to the axis variables, and wherein each of the axis segment variables indicates a tensor size in a corresponding dimension in a case of tensor migration.

7. The method according to claim 6, wherein the second IR further comprises at least one target variable and a value range of each of the at least one target variable, wherein the axis variable is linearly related to the at least one target variable, and indicates a tensor size in a corresponding dimension by using the at least one target variable and the value range of the at least one target variable.

8. The method according to claim 1, wherein the second IR is an IR of a tree structure that comprises a root node and a subnode, wherein the root node corresponds to the computing statement, wherein the subnode corresponds to the second storage location, wherein the second IR comprises information about the subnode corresponding to the second storage location, and wherein the information about the subnode corresponding to the second storage location comprises the first data migration information and the data segmentation information.

9. The method according to claim 1, wherein the second IR further comprises data movement information, and wherein the data movement information indicates that the tensor is moved from the first storage location to the second storage location.

10. The method according to claim 1, wherein the method further comprises:

determining the first storage location and the second storage location based on a type of the processor.

11. A computer system for intermediate representation construction, comprising:

a processor; and one or more memories coupled to the processor and storing programming instructions for execution by the processor to cause the computer system to:

obtain a first intermediate representation (IR), wherein the first IR comprises a computing statement, wherein the computing statement comprises a tensor and an operator, wherein the operator represents an operation that is performed by the processor, the processor is configured to perform an operation on data that is migrated through a first storage location and a second storage location sequentially, and wherein the tensor is data that is used when the operation represented by the operator is performed;

generate a second IR based on the computing statement, wherein the second IR comprises first data migration information and data segmentation information, wherein the first data migration information indicates that a first migration path of the tensor comprises a section that is from the first storage location to the second storage location, and wherein the data segmentation information indicates a tensor size in each tensor migration to the second storage location; and perform an operation on data using a second migration path, wherein the second migration path comprises a section that starts from the first storage location, passes through at least one third storage location, and ends at the second storage location, and wherein the first migration path and the second migration path are different data migration paths.

12. The computer system according to claim 11, wherein the at least one third storage location indicates a storage location in an on-chip buffer.

13. The computer system according to claim 11, wherein further causes the computer system to:
generate first data flow information corresponding to the computing statement based on the computing statement, wherein the first data flow information comprises second data migration information of the tensor, and the second data migration information indicates that the tensor is migrated from the first storage location to the second storage location through at least one third storage location sequentially; and
generate second data flow information based on a direct data transmission path between the first storage location and the second storage location, wherein the second data flow information comprises the first data migration information.

14. The computer system according to claim 11, wherein each of the first storage location and the second storage location indicates a storage location in an on-chip buffer.

15. A non-transitory machine-readable storage medium storing one or more instructions for scheduling a task processing that, when executed by at least one processor, cause the at least one processor to:
obtain a first intermediate representation IR), wherein the first IR comprises a computing statement, wherein the computing statement comprises a tensor and an operator, wherein the operators represents an operation that is performed by a processor configured to perform an operation on data that is migrated through a first storage location and a second storage location sequentially, and wherein the tensor is data that is used when the operation represented by the operator is performed;
generate a second IR based on the computing statement, wherein the second IR comprises first data migration information and data segmentation information, wherein the first data migration information indicates that a first migration path of the tensor comprises a section that is from the first storage location to the second storage location, and wherein the data segmentation information indicates a tensor size in each tensor migration to the second storage location; and
perform an operation on data using a second migration path, wherein the second migration path comprises a section that starts from the first storage location, passes through at least one third storage location, and ends at the second storage location, and wherein the first migration path and the second migration path are different data migration paths.

16. The non-transitory machine-readable storage medium according to claim 15, wherein the at least one third storage location indicates a storage location in an on-chip buffer.

17. The non-transitory machine-readable storage medium according to claim 15, wherein one or more instructions, when executed by the at least one processor, cause the at least one processor to:
generate first data flow information corresponding to the computing statement based on the computing statement, wherein the first data flow information comprises second data migration information of the tensor, and the second data migration information indicates that the tensor is migrated from the first storage location to the second storage location through at least one third storage location sequentially; and
generate second data flow information based a direct data transmission path between the first storage location and the second storage location, wherein the second data flow information comprises the first data migration information.

* * * * *